United States Patent [19]

Kaufman et al.

[11] 4,105,619

[45] Aug. 8, 1978

[54] CABLE FILLER

[75] Inventors: John Joseph Kaufman, Parker, Pa.;
Thomas Emil Luisi, Plainview, N.Y.

[73] Assignee: Witco Chemical Corporation, New York, N.Y.

[21] Appl. No.: 798,977

[22] Filed: May 20, 1977

[51] Int. Cl.$^2$ ................................................ C08K 5/01
[52] U.S. Cl. ........................... 260/33.6 PQ; 174/23 C;
260/28.5 A; 260/45.7 PH; 260/45.85 H;
260/45.95 R; 260/45.95 H; 260/897 A
[58] Field of Search ............... 260/28.5 A, 33.6 PQ,
260/897 A, 45.7 PH, 45.95 A, 45.95 R, 45.85
H; 174/23 C

[56] References Cited

U.S. PATENT DOCUMENTS

| | | | |
|---|---|---|---|
| 3,775,548 | 11/1973 | Zinser et al. | 174/23 C |
| 3,843,568 | 10/1974 | Woodland et al. | 260/876 R |
| 3,856,980 | 12/1974 | Puckowski et al. | 174/23 C |

*Primary Examiner*—Melvyn I. Marquis
*Attorney, Agent, or Firm*—Albert L. Gazzola; Morton Friedman

[57] ABSTRACT

A waterproof filling and flooding composition for communication cables which comprises 90% or more by weight of petrolatum, about 5–7% polybutene-1, 0.5–2.0% polyethylene and the remainder an amorphous saturated rubber such as ethylenepropylene rubber (EPR), exhibits flow resistance at temperatures of 160°–170° F and even higher.

9 Claims, No Drawings

CABLE FILLER

This invention relates to petrolatum-olefin-rubber compositions useful as fillers and flooders for cables particularly telecommunication cables.

Underground cables, particularly communication cables, are filled and flooded usually with petrolatum compositions to protect the coated wires in the cable core from damage, particularly by contact with water. In order to accomplish this protection, it is important that the filler composition possess certain properties, such as flow resistance at prevailing ambient temperatures; resistance to drying, swelling, and cracking after filling into the cable; and it must be of a consistency to be readily filled into the cables at a temperature lower than that which would degrade the coatings on the wires in the cable cores. Filler compositions are employed to fill the core of the cable. Flooding compositions are applied between the core wrap and the outer sheathing as is well known in the art. The present compositions are useful either as filler or flooding compositions, or both.

A typical filler mixture of the prior art is one which comprises a mixture of 85-95% petroleum jelly and 5-15% polyethylene. Such mixtures, although they resist flow at elevated temperatures of up to 160° F, tend to dry and crack and often swell with use in the cable.

Zinser, Jr. et al. in U.S. Pat. No. 3,775,548, granted Nov. 27, 1973, describes such a mixture comprising 80% by weight petroleum jelly, 10% by weight of polyethylene and/or polybutene-1, and 10% by weight polyisobutylene. In Zinser, Jr. et al. is disclosed that when the polyethylene content is reduced to 2%, the melting temperature of the mixture is not sufficiently high to prevent loss of filler from the end of the cable at temperatures which might be experienced in installations in hot geographic regions, e.g. about 160° F. Further, Zinser, Jr. et al. requires that the total polymer be approximately 20% of the filler composition.

Puckowski et al., U.S. Pat. No. 3,856,980, granted December 24, 1974, also disclose mixtures of one or more of polyethylene, polybutene, polyisobutylene, or amorphous polypropylene with petroleum jelly as cable fillers. The compositions of Puckowski et al., like Zinser, Jr. et al., includes high percentages of expensive polymers, i.e. about 17% by weight of polyethylene, and in another instance 74.8% by weight polybutene.

Generally, the prior art filler compositions necessitated high percentages of polymeric materials and often either did not consistently meet the flow requirements or were unsatisfactory for other reasons, such as tendency to swell and crack in the cable. The Rural Electrification Administration (R.E.A.) of the U.S. Department of Agriculture has established functional performance specifications for filling compounds which require zero flow at 150° F under specified conditions. The present compositions exceed these R.E.A. specifications, as will be seen hereinafter.

It is a principle object of this invention to provide a cable filler or flooding composition which exhibits improved flow resistance properties at temperatures of at least 160° F and higher.

It is a further object of this invention to provide a composition as aforesaid in which relatively limited amounts of polymers need be employed.

It is still a further object of this invention to provide a cable filling and/or flooding composition which is relatively inexpensive and yet readily prepared and fabricated with a cable, and yet safe and practical in use.

In accordance with the present invention, a petrolatum based filling or flooding composition that exceeds R.E.A. requirements and yet requires less than 10% alpha olefin polymers is made available.

The present filling and/or flooding compositions are generally useful as both fillers and flooders where they possess all the aforementioned qualities and a viscosity at 266° F of between 550-675 SUS, those having higher viscosities of up to 2000 SUS, for instance, are useful as flooding compositions only. Naturally, the filler compositions must of necessity be more fluid than the flooding compositions because the fillers must flow into the cable core between the wires at a temperature which must not either physically or chemically affect the polyethylene coating, for instance, on the wires; whereas, the flooding compounds, which do not contact the inner core of the cable, may be applied at higher temperatures, and thus could be more viscous.

Broadly speaking, the cable filler composition of this invention comprises at least about 90% by weight of petrolatum, the remainder being polybutene-1/polyethylene, and an amorphous saturated rubber such as ethylene-propylene rubber (EPR).

The preferred cable filler composition pursuant to this invention is shown below in Table I:

TABLE I

| Composition, Wt. % | Approximate Average, Percent By Weight | (Range) |
|---|---|---|
| Petrolatum | 92.0 | (90-94) |
| Ethylene-Propylene Rubber[1] | 1.0 | (0.5-2.0) |
| Polybutene-1[2] | 6.0 | (5.0-7.0) |
| Polyethylene[3] | 1.0 | (0.5-2.0) |
| BHT[4] | — | — |
| Antioxidant[5] | 0.2 | (0.15-0.25) |

Note: [1]Vistalon 404, Exxon Chemical Corporation
[2]Witron 0400, Witco Chemical Corporation
[3]AC-9, Allied Chemical Corporation
[4]DBPC, Koppers, Inc.
[5]Mark 2047, Witco Chemical Corporation Generally, 7 to 9% by weight of combined polybutene-1 and polyethylene and about 1% of an amorphous saturated rubber, such as ethylene-propylene rubber (EPR), renders a filling or flooding composition which consistently exceeds the requisite flow resistance properties as set forth by the R.E.A., while maintaining other desirable properties. Neither the polyethylene nor the rubber are present at concentrations greater than 2.0% by weight and preferably not greater than 1.5% for best results.

Petrolatum suitable for use in preparing the flow resistant compositions has a consistency at room temperature between a liquid having a viscosity of about 100 SUS and a semi-solid gelatinous mass having a melting point of about 60° C. The preferred petrolatum is generally characterized as a narrow fraction with minimal oil content, i.e. less than 15% as determined by ASTM D-721, and has good electrical properties such as dielectric constant at $10^5$ and $10^6 H_z$ of 2.25 maximum; and a dissipation factor at $10^5 H_z$ of 0.0004 maximum; and at $10^6 H_z$ of 0.0008 maximum; and d.c. volume resistivity in ohms/cm. of $1 \times 10^{14}$ minimum.

A typical preferred petrolatum is Petrolatum HM available from Witco Chemical Corporation of New York, New York.

Suitable polybutene-1 useful pursuant to the invention is preferably a homopolymer wherein the molecular weight is relatively low as indicated by a melt index of from about 10 to 25, and preferably about 20. One preferred polybutene-1 homopolymer is Witron 0400 of Witco Chemical Corporation; New York, N.Y. ("Witron" is a registered trademark of Witco.)

Suitable polyethylene pursuant to this invention is preferably the homopolymer which is at least about 90% crystalline, having a specific gravity in excess of 0.9 and a molecular weight range of from 3500 to 4500. One preferred polyethylene is AC-9 of Allied Chemical Corporation; Morristown, New Jersey, having a molecular weight of about 4000.

The rubber component pursuant to the present composition is one which exhibits the typical rubber characteristics and is compatible with the petrolatum and polybutene-1/polyethylene. One such preferred rubber is the ethylene-propylene copolymer sold as Vistalon 404 by Exxon Chemical Corporation; New York, N.Y. ("Vistalon" is a registered trademark of Exxon.)

Antioxidants normally used with polyolefin cable fillers are also useful in the present composition. Such antioxidants include, for instance, the organic phosphites, such as trisnonylphenyl phosphite and others disclosed in U.S. Pat. No. 3,255,136 issued to Hecker et al. in 1966; 2,6 ditertiary butyl-4-methylphenol; 2,2'-methylenebis-(6-a-methylcyclohexyl-4-methylphenol); 4,4'-thiobis-(6-tertiary butyl-3-methylphenol); tris-(2-methyl-4-hydroxy-5-tertiary butylphenol) butane; dilauryl-BB'-thiodipropionate; butylated hydroxy toluene (BHT); butylated hydroxy anisole (BHA); and the like, and mixtures thereof, as known in the art. The preferred antioxidant is Mark 2047 of Witco Chemical Corporation; New York, N.Y., ("Mark" is a registered trademark of Witco Chemical Corporation), which consists of a mixture of thiodipropionate ester, an organic polyhydric phenol, and an organic phosphite as disclosed in the foregoing patent to Hecker.

The proportion of antioxidant incorporated in the filling composition will at times depend upon the type of cable, the conductor insulation used, and the antioxidant or antioxidants employed. Generally, the proportion of antioxidant or mixtures of antioxidants will not exceed 0.5 percent by weight, and preferably be in the range of 0.15 to 0.25.

The present compositions are prepared by heating the petrolatum to about 280° F and adding the antioxidant followed by the polyolefins and rubber, with stirring, as is well known in the art.

The following examples are presented in further illustration of the invention and to provide comparison with compositions not included within the scope of the invention.

EXAMPLES A THROUGH G

As previously stated the R.E.A. in P.E. No. 39 has established functional performance specifications for filling compounds which require zero flow at 150° F under specified conditions.

The R.E.A. flow resistance test is, by design, performed with sections of "finished" cable, that is, cable which has been filled, wrapped, shielded, and jacketed. On a bench scale, the R.E.A. test conditions are simulated by using a 25-pair, shielded and jacketed "air core" cable, i.e. the core of the cable is filled with air rather than with a filling compound as the dielectric. Preliminary test results with polyethylene (no polybutene-1) and petroleum were compared with R.E.A. test results and the correlation was good.

Several filler compositions, identified as A through G were compounded in the conventional manner and tested as per above. Also, other characteristics of importance in cable filler applications; namely, melting point, viscosity, and cone penetration were also measured and are reported in Table II, below.

TABLE II

| Examples: | A | B | C | D | E | F | G |
|---|---|---|---|---|---|---|---|
| Blend Composition, Wt. % | | | | | | | |
| Petrolatum HM[1] | 94 | 92 | 91 | 93 | 92.5 | 91 | 91 |
| Ethylene-Propylene Rubber[2] | 1 | 1 | 1 | 1 | 1 | 2 | 1 |
| Polybutene-1[3] | 5 | 6 | 6 | 6 | 6 | 6 | 7 |
| Polyethylene[4] | 0 | 1 | 2 | 0 | 0.5 | 1 | 1 |
| Antioxidant[5] | | | | | | | |
| Melting Point, ° F | | | | | | | |
| Congealing, ASTM D-938 | 128 | 164 | 178 | 136 | 156 | 167 | 170 |
| Drop, ASTM D-127 | 195.5 | 204.8 | 206.8 | 200.0 | 202.0 | 204.3 | 204.0 |
| Viscosity, Kinematic, ASTM D-445 | | | | | | | |
| SUS At 266° F | 503 | 659 | 722 | 608 | 642 | 1567 | 829 |
| Cone Penetration, ASTM D-217 | | | | | | | |
| Unworked, dmm At 77° F | 94 | 70 | 57 | 89 | 78 | 63 | 64 |
| Worked, dmm At 77° F | 257 | 230 | 225 | 242 | 240 | 200 | 253 |
| R.E.A. Filling Compound Flow Test, PE-39 | | | | | | | |
| Cumulative Drops From Three Specimens | | | | | | | |
| After 24 Hours At 160° F | 6 | 1 | 0 | 5 | 0 | 0 | 1 |
| After 24 Hours At 170° F | 20 | 2 | 1 | 12 | 2 | 0 | 4 |
| After 24 Hours At 180° F | 44 | 5 | 3 | 20 | 5 | 3 | 5 |
| After 24 Hours At 190° F | 58 | 7 | 4 | 31 | 12 | 7 | 5 |

Note: [1]Witco Chemical Corporatin
[2]Vistalon 404, Exxon Chemical Corporation
[3]Witron 0400, Witco Chemical Corporation
[4]AC-9, Allied Chemical Corporation
[5]All Blends Contained 0.2 Wt. % Mark 2047, Witco Chemical Corporation Thus it is shown that compositions B, C, E, F, and G containing polybutene-1, polyethylene and rubber, exhibited flow resistance characteristics of 0 to 1 at 160° F and therefore consistently approximately zero at 160° F. At 170° F, all but G were between 0 and 2.

In contrast, compositions identified as A and D, which contained the rubber and only the polybutene-1 homopolymer exhibited unacceptable flow resistance characteristics.

Cables containing the present flow resistant filler and flooding composition can be fabricated by suitable techniques well known in the art.

Although the invention has been described in considerable detail, such detailed description is only for the purpose of illustrating specific embodiments. It is evident that many variations and modifications can be made from those described without departing from the spirit and scope of the invention.

The embodiments of the invention in which an exclusive property or privilege is claimed are defined as follows:

1. A cable filling and flooding composition comprising at least about 90% by weight of petrolatum; about 5–7% by weight of polybutene-1; about 0.5–2.0% by weight of polyethylene; and about 0.5–2.0% by weight of an ethylene propylene rubber.

2. The composition of claim 1, having an R.E.A. flow rate of approximately zero at 160° F.

3. The composition of claim 1, further comprising 0.15 to about 0.25% by weight of an antioxidant.

4. The composition of claim 1, comprising a mixture of antioxidants.

5. The composition of claim 1, wherein the polyethylene is at least about 90% crystalline.

6. The composition of claim 1, wherein the polybutene-1 has a melt index of from 10–25.

7. The composition of claim 1, comprising about 92% by weight of petrolatum; 6% by weight of polybutene-1; 1% by weight of polyethylene; 1% by weight of ethylene-propylene rubber; and an antioxidant.

8. The composition of claim 7, having an R.E.A. flow rate of approximately zero at 160° F.

9. A communication cable filled and flooded with the composition of claim 8.

* * * * *